(12) United States Patent
Tsai et al.

(10) Patent No.: US 7,511,954 B2
(45) Date of Patent: Mar. 31, 2009

(54) DOCKING STATION

(75) Inventors: Chih-Sheng Tsai, Taipei (TW); Chien-Chiang Huang, Tapei (TW)

(73) Assignee: ASUSTeK Computer Inc., Taipei (TW)

( * ) Notice: Subject to any disclaimer, the term of this patent is extended or adjusted under 35 U.S.C. 154(b) by 297 days.

(21) Appl. No.: 11/464,831

(22) Filed: Aug. 16, 2006

(65) Prior Publication Data
US 2007/0073952 A1 Mar. 29, 2007

(30) Foreign Application Priority Data
Aug. 18, 2005 (TW) .............................. 94128159 A

(51) Int. Cl.
*G06F 1/16* (2006.01)

(52) U.S. Cl. ...................................... 361/686; 710/303

(58) Field of Classification Search ................. 361/686; 710/303, 304
See application file for complete search history.

(56) References Cited

U.S. PATENT DOCUMENTS

| | | | | |
|---|---|---|---|---|
| 5,535,093 A | * | 7/1996 | Noguchi et al. | 361/686 |
| 5,737,541 A | * | 4/1998 | Shimizu et al. | 710/303 |
| 5,790,375 A | * | 8/1998 | Lee | 361/686 |

* cited by examiner

*Primary Examiner*—Lisa Lea-Edmonds
(74) *Attorney, Agent, or Firm*—Jianq Chyun IP Office

(57) ABSTRACT

A docking station including a housing, a linkage, a forcing member and a first connector for electrically connecting to a first connector of an electronic device, is provided. The housing includes a platform having a first opening and the electronic device is suitable for being placed on the platform. The housing further comprises a second opening located outside the platform. The linkage is disposed within the housing. The forcing member disposed on the second opening is connected to one end of the linkage, wherein the forcing member is suitable for moving back and forth along a predetermined path to actuate the linkage. The first connector disposed on the first opening is connected to the other end of the linkage, wherein the first connector is suitable for expanding and contracting in the first opening through the linkage to be connected to or disconnected from the second connector of the electronic device.

6 Claims, 5 Drawing Sheets

DOCKING STATION

CROSS-REFERENCE TO RELATED APPLICATION

This application claims the priority benefit of Taiwan application serial No. 94128159, filed on Aug. 18, 2005. All disclosure of the Taiwan application is incorporated herein by reference.

BACKGROUND OF THE INVENTION

1. Field of the Invention

The present invention relates to a docking station, and more particularly, to a docking station whose connector can be expanded or contracted by a linkage.

2. Description of the Related Art

The major difference between the laptop computer and the conventional desktop computer is that the laptop computer is designed to be lighter, thinner, shorter, and smaller, such that it is more portable, and users can operate the computer in different environments. However, the laptop computer is also limited by its compact design, thus the functionality and expandability are not as good as the conventional desktop computer.

Therefore, a docking station with a connector was introduced in the prior art. The peripheral devices such as mouse, printer, external hard drive, network interface adapter (NIC), or scanner can be electrically connected to the docking station for a long-term use. When the user needs to use these peripheral devices, the laptop computer is connected to the docking station, and the peripheral devices can be electrically connected to the laptop computer. Accordingly, while enjoying the convenience of the laptop computer, the user can also do without repeatedly plugging in and out the peripheral device(s) into/from the laptop computer, with the docking station. Therefore, the user can enjoy the same level of the functionality and expandability as the desktop computer offers.

However, since the connector mentioned above is fixed on the docking station, and located below the laptop computer while the laptop computer is connected to the docking station, it is not easy for the user to align the position of the laptop computer onto the docking station when connecting the laptop computer to the docking station, and the connector or the laptop computer can be easily damaged due to the misalignment between the laptop computer and the docking station.

SUMMARY OF THE INVENTION

Therefore, it is an object of the present invention to provide a docking station for avoiding the damage when the electronic device is connected to the docking station.

The present invention provides a docking station suitable for electrical connection to a second connector of a first electronic device. The docking station at least includes a housing, a linkage, a forcing member and a first connector for electrically connecting the second connector of the first electronic device. The housing includes a platform having a first opening and the electronic device is placed on the platform. The housing further has a second opening located outside the platform. The linkage is disposed within the housing. The forcing member is disposed on the second opening and connected to one end of the linkage, wherein the forcing member is suitable for moving back and forth along a predetermined path to actuate the linkage. The first connector is disposed on the first opening and connected to the other end of the linkage, wherein the first connector expands or contracts in the first opening through the linkage to be connected to or disconnected from the second connector of the first electronic device.

In an embodiment of the present invention, the linkage comprises a first link rod and a second link rod. One end of the first link rod is connected to the forcing member, and the first link rod has a first pivot disposed between two ends of the first link rod. One end of the second link rod is connected to the other end of the first link rod, and the other end of the second link rod is connected to the first connector. In addition, the second link rod has a second pivot disposed between two ends of the second link rod. When the forcing member moves to a first position, the forcing member actuates the first link rod to rotate, and then the first link rod actuates the second link rod to rotate, such that the first connector expands from the first opening of the housing. On the other hand, when the forcing member moves to a second position, the forcing member actuates the first link rod to rotate, and then the first link rod actuates the second link rod to rotate, such that the first connector contracts from the first opening of the housing.

In an embodiment of the present invention, the other end of the first link rod has a slide track, and one end of the second link rod connected to the first link rod has a slide block. The slide block is disposed in the slide track. When the forcing member moves to the first position, the slide block moves to one end of the slide track, and when the forcing member moves to the second position, the slide block moves to the other end of the slide track.

In an embodiment of the present invention, the joint point between the first connector and the second connector of the first electronic device is a specific arc angle.

In an embodiment of the present invention, the second connector has a plurality of first alignment holes, and the first connector has a plurality of first alignment poles corresponding to the first alignment holes. Wherein, the first alignment poles are suitable for being inserted into the first alignment holes.

In an embodiment of the present invention, the docking station has a slot suitable for being electrically connected to a second electronic device, such that the first electronic device is electrically connected to the second electronic device through the docking station.

In an embodiment of the present invention, the first electronic device has a plurality of second alignment holes, and the housing has a plurality of second alignment poles corresponding to the second alignment holes. Wherein, the second alignment poles are suitable for being inserted into the second alignment holes.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

Figure 4A:
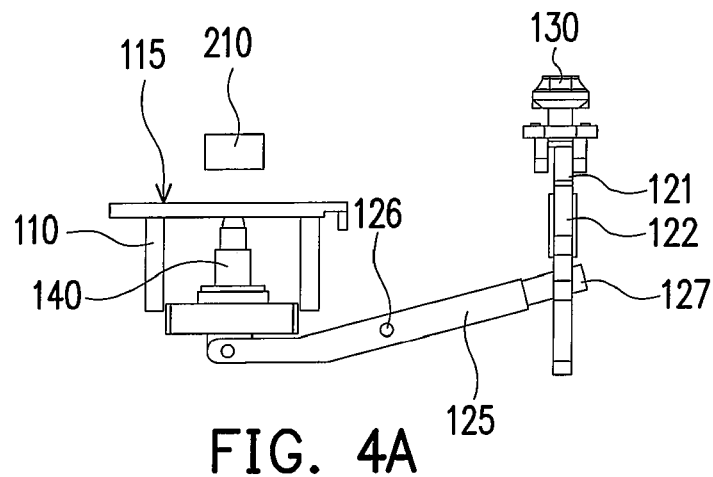
Figure 4B:
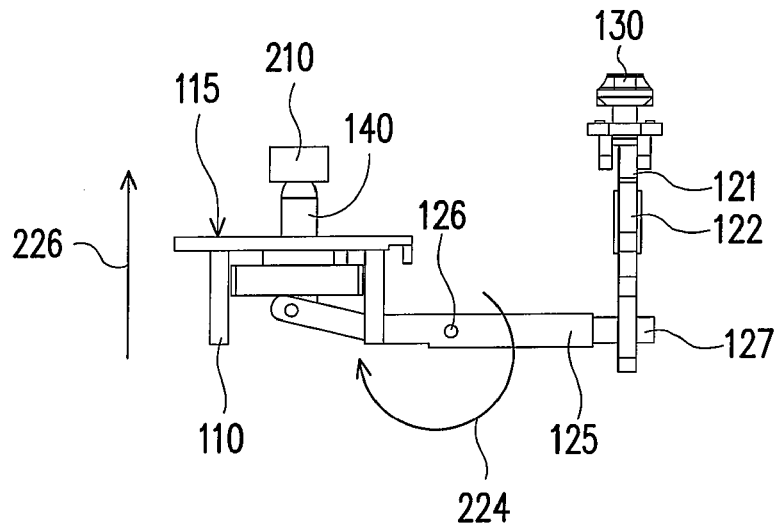
Figure 4C:
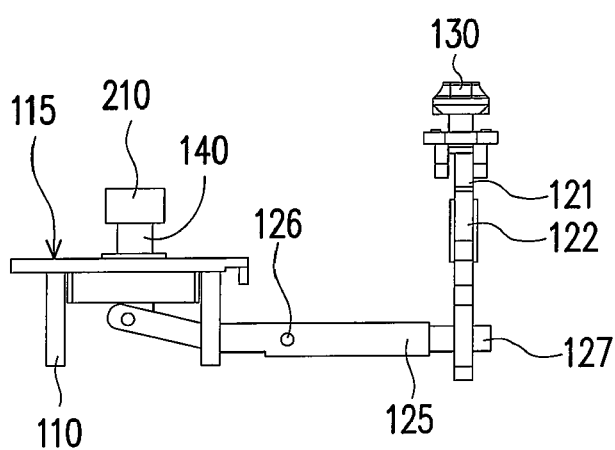

FIGS. 4A~4C are schematic side views illustrating the actuation of the linkage.

Figure 5A:
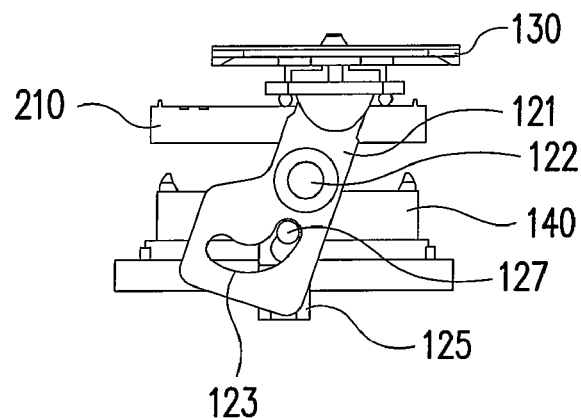
Figure 5B:
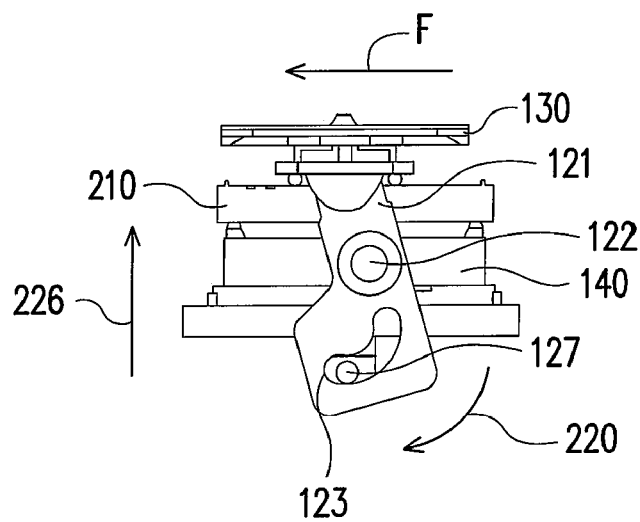
Figure 5C:
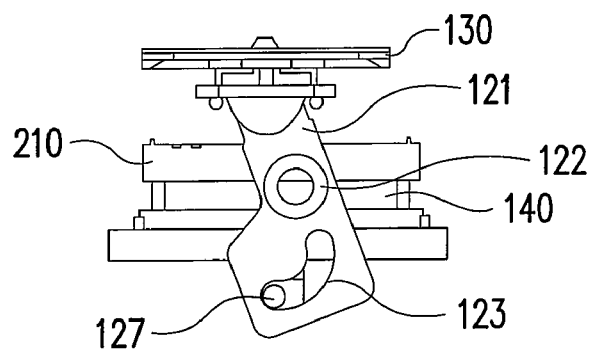

FIGS. 5A~5C are schematic front views illustrating the actuation of the linkage.

Figure 6:
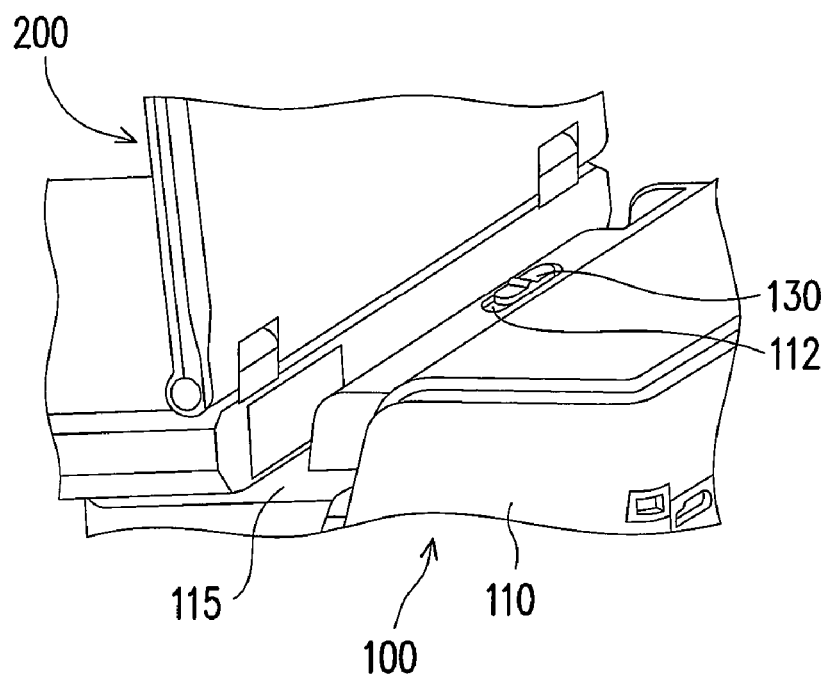
Figure 7:
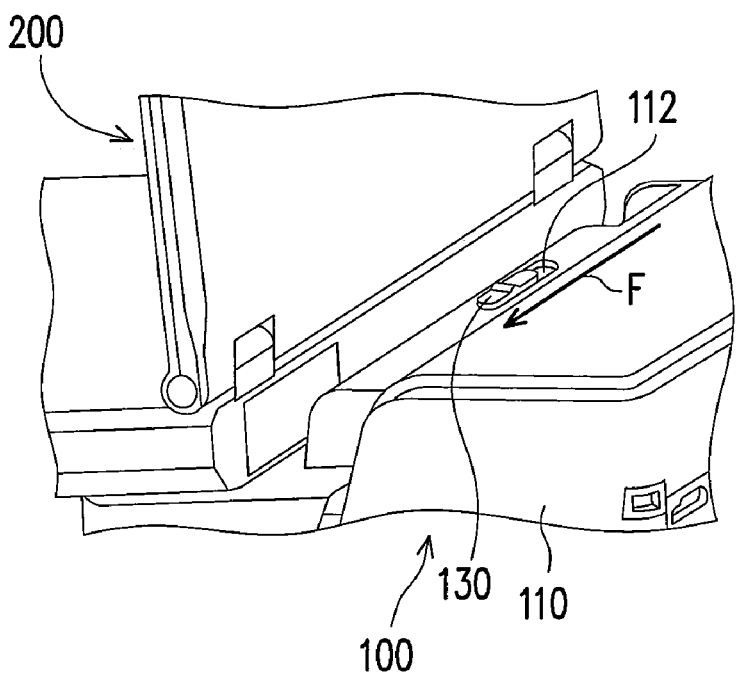

FIG. 6 and FIG. 7 are schematic flowcharts illustrating the operation of electrically connecting the electronic device to the docking station.

DESCRIPTION OF EMBODIMENTS

Figure 1:
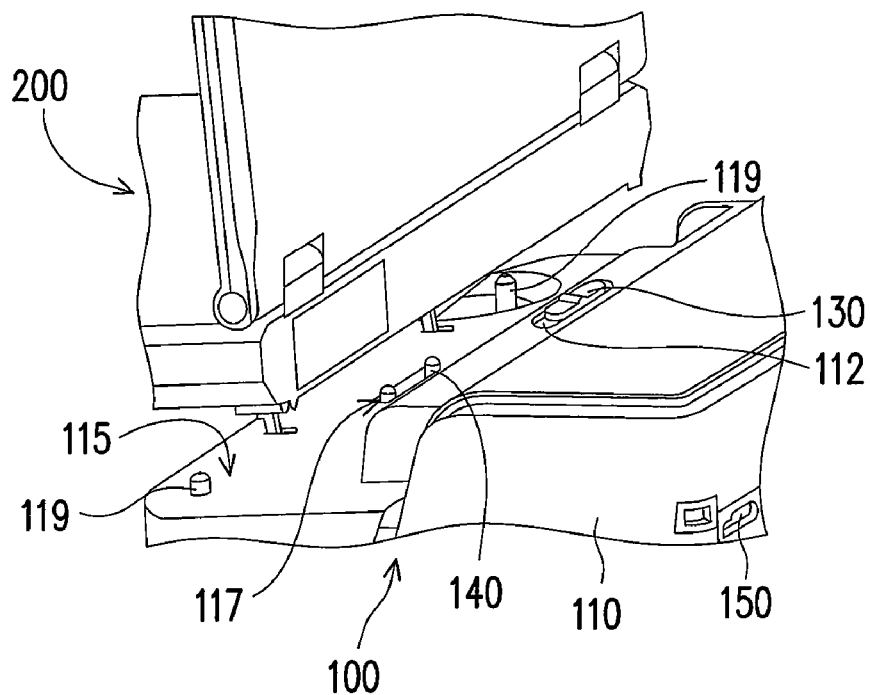
FIG. 1 is a schematic diagram of a docking station according to an embodiment of the present invention.
Figure 2:
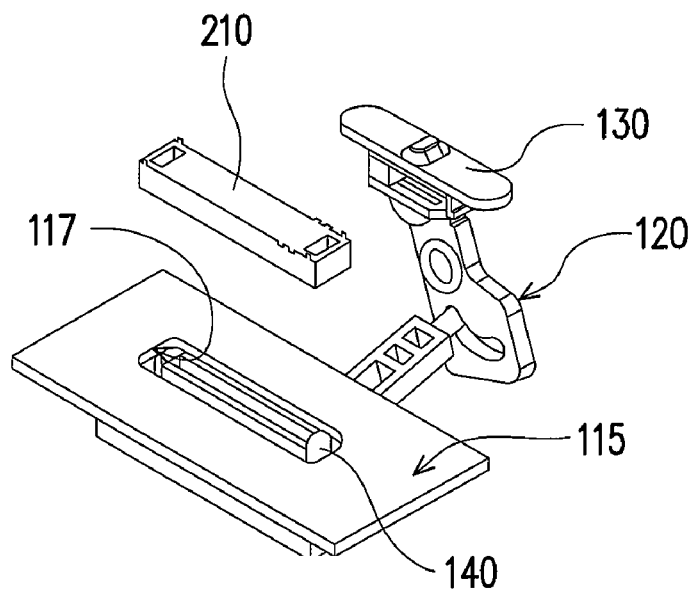
FIG. 2 is a schematic diagram of a linkage in the docking station of FIG. 1.

FIG. 1 is a schematic diagram of a docking station according to an embodiment of the present invention, and FIG. 2 is a schematic diagram of a linkage in the docking station of FIG. 1. Referring to FIG. 1 and FIG. 2, a first connector 140 of a docking station 100 is suitable for being electrically connected to a second connector 210 of an electronic device 200. Wherein, the electronic device 200 may be a mobile computer (i.e. a laptop computer or a notebook computer) or a personal digital assistant (PDA). The docking station 100 at least comprises a housing 110, a linkage 120, a forcing member 130, and the first connector 140 mentioned above. Wherein, the housing 100 has a platform 115, and the platform 115 has a first opening 117. The electronic device 200 is suitable for being placed on the platform 115. In addition, the housing 110 further has a second opening 112 located outside the platform 115. Moreover, the docking station 100 may further comprise a plurality of slots 150. When other electronic peripheral devices, such as display, mouse, keyboard, and/or speaker, are connected to the slots 150, the electronic device 200 is electrically connected to these electronic devices through the docking station 100.

The linkage 120 is disposed within the housing 110 (referring to FIG. 2). The forcing member 130 disposed on the second opening 112 is connected to one end of the linkage 120, wherein the forcing member 130 is suitable for moving back and forth along a predetermined path to actuate the linkage 120. The first connector 140 is disposed on the first opening 117 and connected to the other end of the linkage 120, wherein the first connector 140 is suitable for expanding and contracting in the first opening 117 by the linkage 120 to be connected to or disconnected from the second connector 210 of the electronic device 200.

Figure 3:
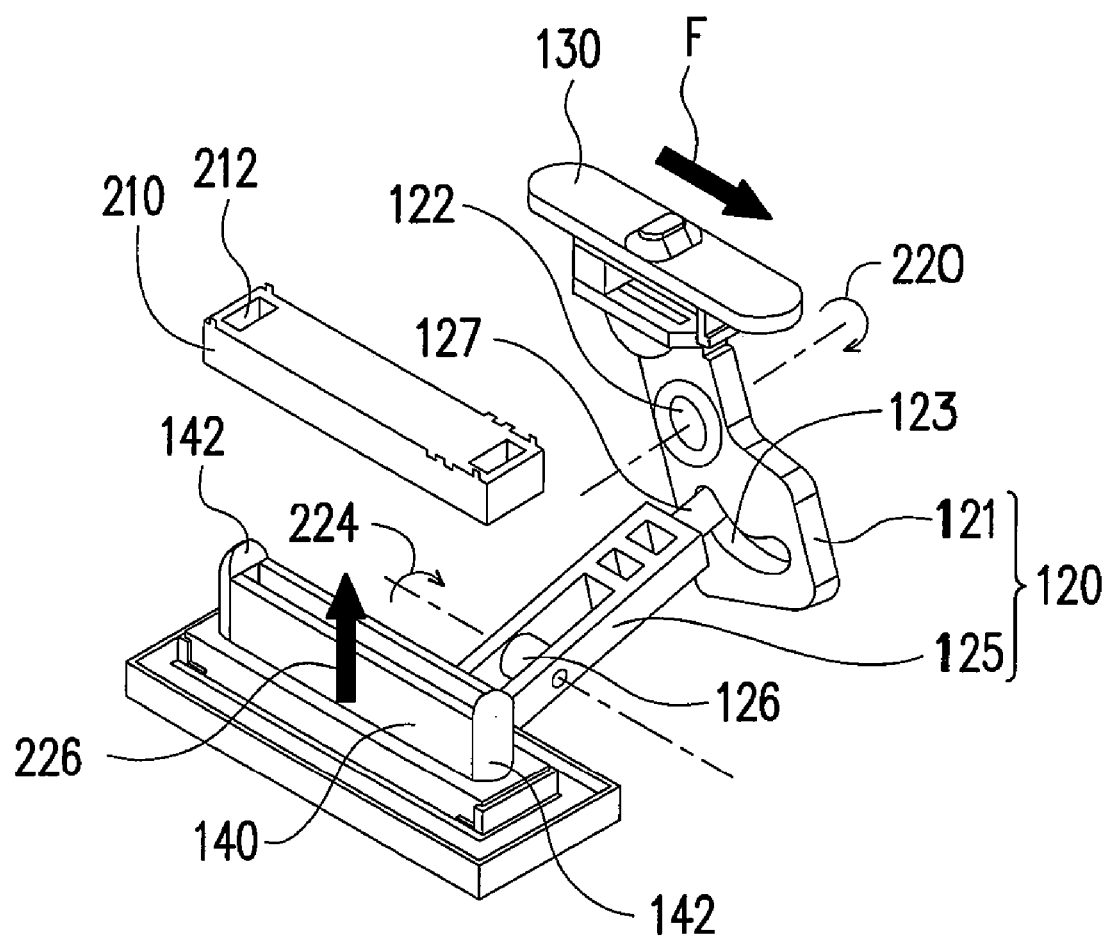
FIG. 3 is another schematic diagram of a linkage in the docking station.

In an embodiment of the present invention, the structure of the linkage 120 is as shown in FIG. 3. Referring to FIG. 3, the linkage 120 at least comprises a first link rod 121 and a second link rod 125. Wherein, one end of the first link rod 121 is connected to the forcing member 130, and the other end of the first link rod 121 is connected to one end of the second link rod 125. The first link rod 121 has a first pivot 122 disposed between two ends of the first link rod 121. In addition, the other end of the second link rod 125 is connected to the first connector 140, wherein the second link rod 125 has a second pivot 126 disposed between two ends of the second link rod 125. Note that although the axis of the first pivot 122 in FIG. 3 is perpendicular to the axis of the second pivot 126, one of ordinary skill in the art can make a linkage 120 with the same function even when the first pivot 122 is not parallel to the second pivot 126.

In addition, the first link rod 121 may be connected to the second link rod 125 through a slide track and a slide block. For example, a slide track 123 may be disposed on the other end of the first link rod 121 in the present embodiment, and a slide block 127 may be disposed on one end of the second link rod 125. Wherein, the slide block 127 is disposed in the slide track 123, and the slide block 127 is suitable for being slid back and forth on the slide track 123. The actuation of the linkage 120 is described in more details hereinafter.

FIGS. 4A~4C are schematic side views illustrating the actuation of the linkage, and FIGS. 5A~5C are schematic front views illustrating the actuation of the linkage. Referring to FIG. 2, FIG. 4A, and FIG. 5A, the forcing member 130 is located on the first position. Meanwhile, the first connector 140 is located below the first opening 117 inside the housing 110. Note that when the forcing member 130 is located on the first position, the slide block 127 is located on one end of the slide track 123 (as shown in FIG. 5A).

Referring to FIG. 3, FIG. 4B, and FIG. 5B, when the forcing member 130 is moving along a predetermined path in response to an external force F, the first link rod 121 rotates in a spinning direction 220 centering on a first pivot 122 in response to the actuation of the forcing member 130. Meanwhile, the slide block 117 moves along the slide track 123, and the second link rod 125 rotates by the actuation accordingly. Wherein, the second link rod 125 rotates in a spinning direction 224 centering on a second pivot 126. Meanwhile, the first connector 140 on the other end of the second link rod 125 moves along a direction 226 towards the second connector 210 in response to the actuation of second link rod 125.

Referring to FIG. 4C and FIG. 5C, when the forcing member 130 moves to the second position, the slide block 127 is located at one end of the slide track 123 (referring to FIG. 5A and FIG. 5C). Meanwhile, the first connector 140 expands from the housing 110 through the first opening 117.

Of course, the forcing member 130 may move from the second position to the first position in response to another external force F' (not shown). Meanwhile, the first connector 140 moves in response to the actuation of the first linkage 120, such that the first connector 140 is disconnected from the second connector 210 and contracts inside the housing 110 through the first opening 117. Since all of the operation principles of the components in this mechanism are similar to FIG. 4A~4C and FIG. 5A~5C except the moving direction, the details are not repeated herein.

It is known from the description mentioned above that through the forcing member 130 moving back and forth between the first position and the second position, the first connector 140 can expand from the housing 110 or contract inside the housing 110. Therefore, the user can align the position of the electronic device 200 onto the docking station 100, and then use the mechanism mentioned above to connect the second connector 210 of the electronic device 200 to the first connector 140 of the docking station 100, such that the damage due to the misalignment between the second connector 210 and the first connector 140 is effectively eliminated. The detailed procedure of connecting the electronic device 200 to the docking station 100 is described in more details hereinafter.

FIG. 6 and FIG. 7 are schematic flowcharts illustrating the operation of electrically connecting the electronic device to the docking station. Referring to FIG. 1, FIG. 6, and FIG. 7, in FIG. 1, the electronic device 200 is not disposed on the docking station 100 yet, meanwhile the forcing member 130 is located on the first position; that is, the first connector 140 is located inside the housing 110. Then, referring to FIG. 6, the electronic device 200 is placed on the platform 115 of the docking station 100, and the alignment of the first connector 140 of the docking station 100 to the second connector 210 of the electronic device 200 is completed. Then, as shown in FIG. 7, an external force F is applied on the forcing member 140 to push the forcing member 140 to the second position. Accordingly, the first connector 140 expands from the housing 110 through the first opening 117 for connecting to the second connector 210, such that the docking station 100 is electrically connected to the electronic device 200.

When the user needs to disconnect the electronic device 200 from the docking station 100, an external force is applied onto the forcing member 130, such that the forcing member 130 moves from the second position to the first position and the first connector 140 is disconnected from the second connector 210. Afterwards, the electronic device 200 can be easily separated from the docking station 100.

In addition, in order to facilitate the alignment between the first connector 140 of the docking station 100 and the second connector 210 of the electronic device 200, a design using a plurality of alignment holes and alignment poles can be further applied in an embodiment of the present invention to speed up the alignment. Referring to FIG. 1, the docking station 100 may further comprise a plurality of first alignment poles 119 located on the platform 115. In addition, a plurality of fist alignment holes (not shown) corresponding to the first alignment poles 119 are disposed on a surface opposite to the platform 115 on the electronic device 200. Accordingly, when the user needs to align the position of the first connector 140 of the docking station 100 onto the second connector 210 of the electronic device 200, the alignment can be easily accomplished by merely placing each of the first alignment holes (not shown) onto the corresponding first alignment poles, such that the alignment is easily and accurately performed, which not only speeds up the alignment, but also prevents the first connector 140 and/or the second connector 210 from any damage.

Moreover, in order to reinforce the attachment between the first connector 140 and the second connector 210, a design using a plurality of second alignment holes and second alignment poles is further applied in an embodiment of the present invention. Referring to FIG. 3, for example, the first connector 140 may comprise a plurality of second alignment poles 142, and the second alignment poles 142 may have a specific arc angle. In addition, the second connector 210 may comprise a plurality of second alignment holes 212 corresponding to the second alignment poles 142, respectively. Accordingly, when the first connector 140 is connected to the second connector 210, the second alignment poles 142 are inserted into the corresponding second alignment holes 212 respectively, such that the attachment is reinforced. Furthermore, if the second alignment poles 142 have the specific arc angle, the arc angle will compensate the tolerance of the alignment between the first connector 140 and the second connector 210, such that the attachment is more smooth and the damage of the first connector 140 and/or the second connector 210 is further prevented.

In summary, the docking station of the present invention has at least the following advantages:

1. After the electronic device is aligned to the docking station, the first connector can be expanded through the second opening to connect to the second connector of the electronic device. Accordingly, the docking station in the present invention can avoid the damage of the first connector of the docking station or the second connector of the electronic device due to misalignment.

2. Since the electronic device and the docking station respectively have the matching first alignment holes and first alignment poles, the electronic device can be easily and accurately aligned on the docking station through the first alignment holes and the first alignment poles.

3. Since the first connector and the second connector respectively have the matching second alignment holes and second alignment poles, the attachment between the first connector and the second connector is reinforced through the second alignment holes and the second alignment poles.

4. Since the second alignment poles have a specific arc angle, the tolerance of the alignment between the first connector and the second connector can be compensated by the arc angle, thus the attachment between the first connector and the second connector is reinforced.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A docking station suitable for being electrically connected to a second connector of a first electronic device; the docking station at least comprising:

a housing comprising a platform having a first opening, wherein the first electronic device is suitable for being placed on the platform, and the housing further comprises a second opening located outside the platform;

a linkage disposed within the housing;

a forcing member disposed on the second opening and connected to one end of the linkage, wherein the forcing member is suitable for moving back and forth along a predetermined path to actuate the linkage, the linkage comprises:

a first link rod, one end of the first link rod being connected to the forcing member, and the first link rod comprising a first pivot disposed between two ends of the first link rod; and a second link rod, one end of the second link rod being connected to the other end of the first link rod, and the second link rod comprising a second pivot disposed between two ends of the second link rod; and a first connector disposed on the first opening and connected to the other end of the second link rod, wherein, when the forcing member moves to a first position, the forcing member actuates the first link rod to rotate, and then the first link rod actuates the second link rod to rotate, such that the first connector expands through the first opening of the housing, and when the forcing member moves to a second position, the forcing member actuates the first link rod to rotate, and then the first link rod actuates the second link rod to rotate, such that the first connector contracts through the first opening of the housing.

2. The docking station of claim 1, wherein the other end of the first link rod has a slide track, and one end of the second link rod connected to the first link rod has a slide block, the slide block is disposed in the slide track; when the forcing member moves to the first position, the slide block moves to one end of the slide track, and when the forcing member moves to the second position, the slide block moves to the other end of the slide track.

3. The docking station of claim 1, wherein the joint point between the first connector and the second connector of the first electronic device is a specific arc angle.

4. The docking station of claim 1, wherein the second connector comprises a plurality of first alignment holes, and the first connector comprises a plurality of first alignment poles corresponding to the first alignment holes, wherein the first alignment poles are suitable for being inserted into the first alignment holes.

5. The docking station of claim 1, wherein the first electronic device comprises a plurality of second alignment holes, and the housing comprises a plurality of second alignment poles corresponding to the second alignment holes, wherein the second alignment poles are suitable for being inserted into the second alignment holes.

6. The docking station of claim 1, wherein the docking station comprises a slot suitable for being electrically connected to a second electronic device, such that the first electronic device is electrically connected to the second electronic device through the docking station.

* * * * *